Feb. 18, 1964 R. O. OSBORN 3,121,761
METHOD AND APPARATUS FOR PRODUCING REGENERATED CELLULOSE FILM
Filed July 17, 1961 2 Sheets-Sheet 1
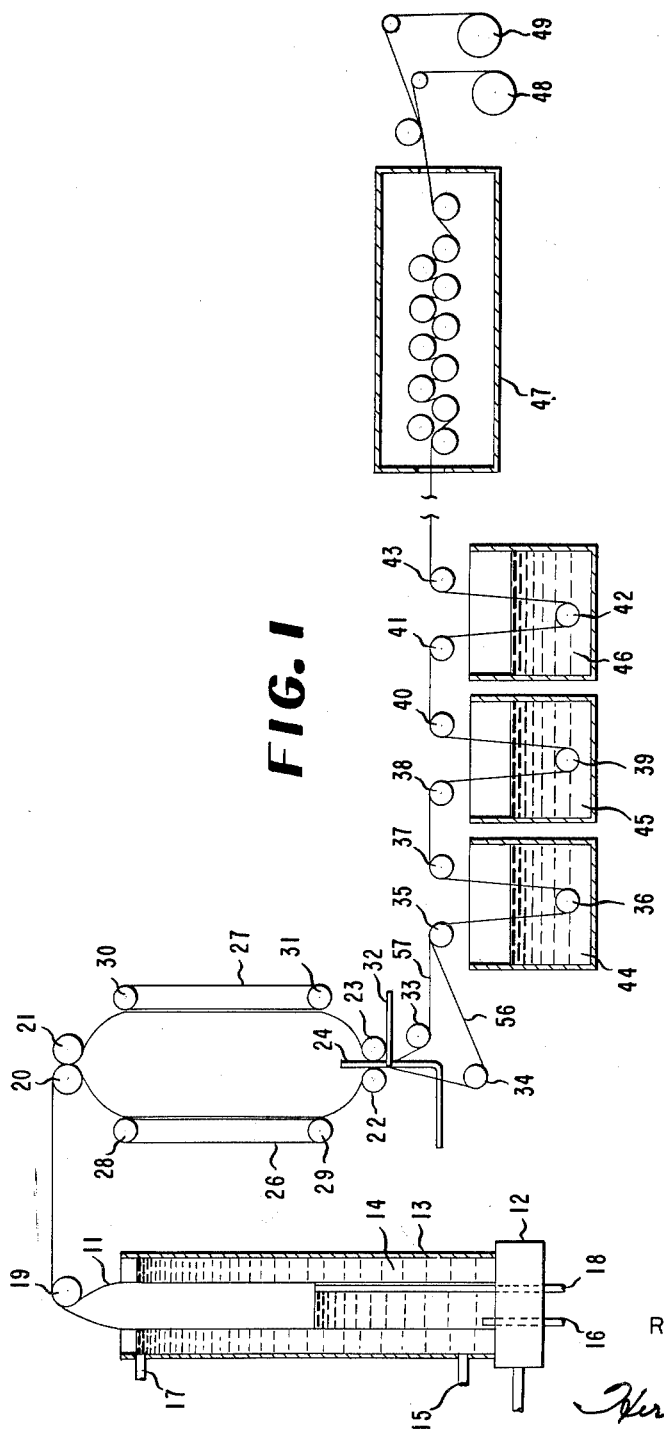
INVENTOR
ROBERT OTTO OSBORN
*Herbert M Wolfson*
ATTORNEY Feb. 18, 1964 R. O. OSBORN 3,121,761
METHOD AND APPARATUS FOR PRODUCING REGENERATED CELLULOSE FILM
Filed July 17, 1961 2 Sheets-Sheet 2
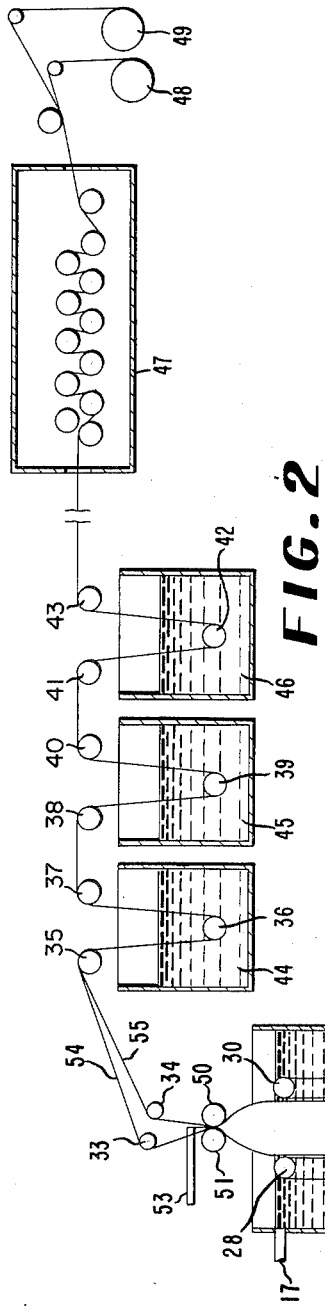
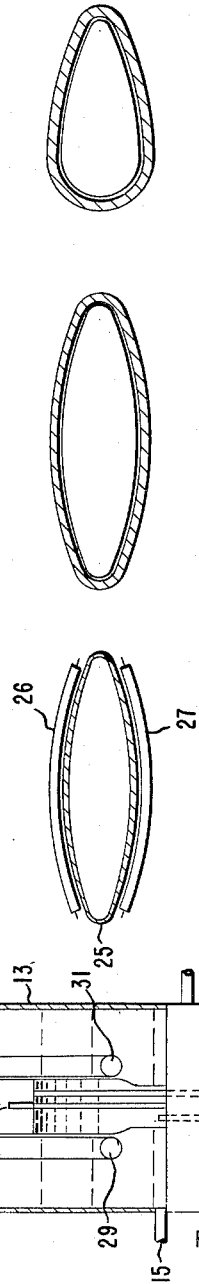
INVENTOR
ROBERT OTTO OSBORN
BY Herbert M. Wolfson
ATTORNEY United States Patent Office 3,121,761
Patented Feb. 18, 1964

3,121,761
METHOD AND APPARATUS FOR PRODUCING REGENERATED CELLULOSE FILM
Robert Otto Osborn, Snyder, N.Y., assignor to E. I. du Pont de Nemours and Company, Wilmington, Del., a corporation of Delaware
Filed July 17, 1961, Ser. No. 124,614
19 Claims. (Cl. 264—95)

This invention relates to the production of non-fibrous polymeric films, foils, sheets and pellicles. The invention is particularly concerned with the production of regenerated cellulose film having improved properties in both the transverse and longitudinal directions and being substantially uniform in thickness across its width and free of striations.

In the conventional system for producing regenerated cellulose films from viscose or other cellulosic solutions, such as cuprammonium cellulose, the film-forming solution is extruded into a coagulating and/or regenerating bath through a narrow slot. The film is drawn from this extrusion slot through a series of treating liquids by using suitably disposed guiding rolls, at least some of which are positively driven. Some rolls are disposed above baths of the treating liquids for transferring film from one bath to another, and some are disposed in the baths, the combination of rolls providing a sinuous path of travel for the film through the baths. The nature of the treating liquids depends upon the particular type of film-forming solution used. When viscose is the film-forming solution, the extruded film may pass from the coagulating and/or regenerating bath into an additional regenerating bath where regeneration is substantially completed and then to suitable washing, desulfuring, bleaching and softening baths of the conventional process.

Because of the force exerted upon the traveling film by the driving rollers, the film is tensioned in the machine or longitudinal direction. The force of the liquid baths as the film moves through each bath, the bath drag, also contributes to stretching the film. Depending upon the rate of the film through the baths, the number of rolls used, the length of travel through the baths, an amount of stretch that may vary from 5% to as high as 50%, based on the initial length of the film, may be inherently imparted to the film in the longitudinal direction. After passing through the liquid treatment baths, the film proceeds in a sinuous path about a series of drying rolls which may be heated internally or may be disposed in a closed chamber through which a heated fluid medium is circulated. At least some of these rolls are driven and the tension produced longitudinally in the film prevents any shrinkage in the longitudinal direction so that the stretch of 5%-50% is retained in the final regenerated cellulose film.

This conventional system for producing regenerated cellulose film provides several difficulties. In the drying of the regenerated cellulose film, it is noted that the edges of the flat sheet cannot be effectively restrained. Hence, the areas adjacent the edges becomes thicker than the rest of the sheet. The extremes of these thickened longitudinal edges on the film are commonly referred to as "beads." To overcome this, one may resort to an extrusion slot, the width of which is tapered down to a narrower width at each end of the slot to compensate for the subsequent edge thickening. However, the use of such a slot produces film edges that are weakened and tear easily during the coagulation step. When a tear starts from the edge of the film, it progresses almost instantly across the entire film, interrupting the operation of the machine. The alternative to this, using a uniform slot and then removing the beads in a slitting operation, is obviously uneconomical.

Another difficulty of the conventional process arises from the unidirectional stretch that is inherent in the process. Because of this inherent stretch of 5%-50% in the longitudinal direction, the important properties of the film, such as the strength, the shrinkage and the swelling of the film, tend to lack uniformity in all directions of the film. The result is a relatively poor film, particularly deficient in durability at temperatures below 5° C., and at humidities below 35% relative humidity. Frequently, this unidirectional stretch also results in longitudinal ridges or striations in the film.

The objects of the present invention are to overcome the difficulties of the conventional system for producing regenerated cellulose film without wasting any of the regenerated cellulose film. A particular object is to provide a regenerated cellulose film of improved strength, toughness, etc., which is substantially uniform in thickness across its width. A further object is to provide a regenerated cellulose film having substantiallly balanced properties in the longitudinal and transverse directions. Other objects include a continuous process and a novel apparatus for producing such regenerated cellulose film. Other objects will appear hereinafter.

The objects are accomplished by the steps of extruding viscose in the form of a tubular film into a coagulating bath; advancing the tubular film through the bath to provide a gel tubular film having a substantially uniform wall thickness; expanding the tubular film, preferably 1½–3 times its extruded diameter, in such a manner as to provide at least one longitudinal lane, preferably two longitudinal lanes in the tubular film, in which the wall thickness is less than the wall thickness of the remainder of the film, preferably so that each longitudinal lane represents approximately 10% of the circumference of the film; slitting the tubular film along the center of each longitudinal lane to provide at least one flat gel film sheet which has relatively thin edge lanes; thereafter, regenerating the coagulated gel film as a flat sheet and then purifying, softening and drying the regenerated cellulose film.

It should be understood that although this invention is described for the preparation of cellophane or regenerated cellulose film from viscose solutions, i.e. from solutions of cellulose xanthate in dilute alkali, the invention is applicable to the preparation of regenerated cellulose films from solutions of other cellulosic intermediates such as alkaline solutions of cuprammonium cellulose, etc. A critical feature of this process, however, is that the step involving expansion of the tubular film is performed on a coagulated but substantially unregenerated cellulosic tubular film, i.e. on a tubular film that is composed substantially of the cellulose intermediate such as the cellulose xanthate or the like. Thus, the critical steps of the process involve coagulating the cellulose intermediate in the form of a gel tubular film having a substantially uniform wall thickness and then expanding the coagulated, substantially unregenerated tubular film in a manner that provides at least one longitudinal lane in which the wall thickness of the film is less than the wall thickness of the remainder of the film. It should be understood that expansion can occur immediately upon emergence of the tubular film from the extrusion die, particularly if the receiving bath is highly effective in coagulating the film.

The non-uniform expansion may be obtained by advancing the tubular film over an elliptical or other non-circular shaping member. However, the most straightforward method of obtaining non-uniform expansion comprises applying pressure, either liquid or gas pressure, within the tubular film and then either superimposing a positive restraining pressure (by mechanical confinement or by application of liquid or gas pressure) around the area or areas whose ultimate thickness is to be greater than the remainder of the film or by superimposing a negative pressure (by heating or applying a vacuum) around the area or areas whose ultimate thickness is to be smaller than the remainder of the film.

After the expansion step, the tubular viscose film may be regenerated to cellulose immediately and slit prior to drying or the film may be slit to form one or more flat sheets of film and then regenerated. In a continuous process, the sequence of steps is important. In the continuous process, it is preferred to slit the film along the center of the comparatively thin longitudinal lane immediately after the expansion step and prior to the regenerating step. In this way the film can be handled in conventional flat form through the conventional bath-containing tanks used for regeneration, purification and softening and through the conventional driers.

As mentioned previously, regenerated cellulose film is stretched inherently from 5% to 50% in the longitudinal direction during the conventional manufacturing process. One purpose of the expansion in the present process is to counteract the inherent longitudinal stretch by providing a similar amount of transverse stretch. Since stretching the film in any direction tends to improve such properties as the strength, durability, etc., in the direction of stretch, one may stretch the film a desired amount deliberately. It is advantageous to impose such stretch on the coagulated, unregenerated film. Thus, both longitudinal stretching and transverse stretching can be carried out simultaneously during the expansion step. The pressure used for expansion would influence the amount of transverse stretching. The ratio of the rate at which the tubular film is withdrawn from the coagulating bath-to-the-rate at which the film is extruded into the coagulating bath will influence the amount of imposed longitudinal stretch. It is preferred that the total amount of stretch in both directions be equal, each being between 1.5 and 3 times the dimensions of the film as extruded, to provide substantially balanced properties in both directions.

An apparatus for performing the process comprises a circular extrusion die, preferably a rotatable or oscillatable circular die, adapted to extrude viscose in the form of a tubular film; means to coagulate the tubular film, preferably a container or a tank adapted to contain a coagulating liquid and to receive the tubular film; means for drawing the film through the coagulating liquid; means for expanding the tubular film disposed either in the container for the coagulating liquid or subsequent to the container; means for controlling the expansion of the tubular film adapted to provide at least one longitudinal lane in the film whose thickness is less than the thickness of the remaining circumference of the film; means for slitting the film adapted to slit along the center of the relatively thin longitudinal lane; and means for regenerating and purifying the slit film as a flat sheet.

In the drawing, which is illustrative of preferred embodiments of the apparatus of the invention, FIGURE 1 is a diagrammatic side elevation of an apparatus for carrying out the invention;

FIGURE 2 is a diagrammatic side elevation of another apparatus for carrying out the invention;

FIGURE 3 is a sectional view of a preferred means for restricting the expansion of the tubular film;

FIGURE 4 is a sectional view of another means for restricting the expansion of the tubular film; and FIGURE 5 is a sectional view of another means for restricting the expansion of the tubular film.

As shown in FIGURE 1, viscose, preferably having a viscosity of at least 3000 poises and prepared in the conventional manner from caustic, carbon disulfide and cellulose, the latter preferably having a degree of polymerization of at least 500, is extruded through a circular die 12 having a lip opening of 10–16 mils into an enclosure or tank 13 containing coagulating liquid 14 to form a tubular film 11. The coagulating liquid, an aqueous solution containing 40%–50% ammonium sulfate and up to about 5% sulfuric acid, is maintained at a temperature of 80° C.–95° C. by means not shown. The coagulating liquid is fed into the tank through inlets 15 and 16. The liquid coming in through 15 serves to coagulate the outside surface of the film, and the liquid entering at 16 serves to coagulate the inner surface of the film. Outlets 17 and 18 serve to maintain the desired level of coagulating liquid around and within the tubular film.

The coagulated tubular gel film is then passed over guide roll 19 through the nip of rolls 20 and 21 and then through the nip of positively driven rolls 22 and 23. Between the two sets of nip rolls, the tubular film is expanded to stretch the film in the lateral or transverse direction. A tube 24 admitted through a circumferential groove in the surface of roll 23 conveys air or another gaseous medium for expanding the tubular film.

To provide at least one lane 25 having a wall thickness that is less than the wall thickness of the remainder of the tubular film, moving belts 26 and 27 are provided to resist expansion of the tubular film 11 by contacting the circumference of the tubular film except for the longitudinal lane 25 and a corresponding lane facing lane 25 on the underside of the tubular film, not shown. The endless belts are preferably moved at the same rate as the advancing tubular film by the driven rotating rolls 28, 29, 30 and 31.

After the expanded film is collapsed through nip rolls 22 and 23, the film is slit by a knife 32 along the center of the reduced thickness lanes. The resulting two flat sheets of gel film 56 and 57 are then led as superimposed sheets by rolls 33—43 through a sulfuric acid-metal sulfate regenerating bath 44, the purification bath 45 and the softening bath 46. After softening, the film sheets are led to the drying chamber 47. The dried sheets are separated and wound on rolls 48 and 49.

FIGURE 2 represents an alternative apparatus for practicing the present invention. In this figure, the tubular gel film is expanded between the die and nip rolls 50 and 51 by means of air passing through tube 52. The tube 52 is admitted into the interior of the tubular film 11 by a suitable opening in the die 12. After passing through driven nip rolls 50 and 51, the tubular film is slit by knife 53 and the resulting two film sheets 54 and 55 are processed as in FIGURE 1.

FIGURE 3 is a sectional view showing the contour of the endless belts 26 and 27. It will be noted that the belts are concave toward the tubular film.

FIGURE 4 represents another means for restraining the expansion of the tubular film by using an external sleeve having the elliptical shape as shown. Tubing having two lanes of relatively thin walls at the two ends of the major axis of the ellipse result.

FIGURE 5, another means of restraining expansion, discloses a sleeve having a tear-drop form. It provides a tubular film having just one lane in which the wall thickness is relatively thinner than the remainder of the tubular film.

To provide longitudinal lanes of relatively thin wall thickness in the tubular film, only mechanical means have been shown, i.e. means that operate by selectively contacting the tubular film during expansion. However, it is also possible to employ heating means to accomplish this result. Thus, by heating one or two areas of the film for a very short period (1–3 seconds) as the expanding film advances past the heating sources, the heated areas will expand more readily giving rise to lanes of relatively less thickness than the remainder of the tubular film. It is also possible to impress a vacuum at one or two areas of the advancing film during expansion to provide additional stretch at these areas and, hence, to provide thinner walls along longitudinal lanes.

The invention will be more clearly understood by referring to the examples which follow. Example 1 represents the best mode contemplated for carrying out the invention.

*Example 1*

Alkali cellulose was prepared from sheets of paper-grade pulp having a degree of polymerization of 1000 by steeping the sheets in an aqueous solution containing 18.5% caustic at 23° C. for 30 minutes. The resulting alkali cellulose was then pressed to a press-weight ratio of 2.8:1. The steeped sheets were then shredded at about 30° C. in a conventional shredder for about 2 hours. Immediately thereafter the unaged alkali cellulose was xanthated by reaction with 35% carbon disulfide based on the weight of the dry pulp. Xanthation was carried out in the conventional baratte maintained at a temperature of about 35° C. for 2 hours. Dilute caustic solution was then added to the xanthated alkali cellulose and the mixture was stirred in a vessel at a temperature between 5 and 10° C. for a period of 3 hours. The resulting viscose contained 9% cellulose and 5.5% sodium hydroxide and had a viscosity of 4000 poises.

The viscose was extruded through the lips of an oscillating circular die, the lip opening of the die being 36 mils, into an aqueous bath containing 50% ammonium sulfate and maintained at a temperature of 90° C. The resulting coagulated tubular gel film was then advanced between two sets of nip rolls where it was expanded pneumatically by maintaining air at a pressure of 28 inches of water within the interior of the tubular film. This gas pressure served to expand the tubular film, which originally had a wall thickness of 11 mils, to a wall thickness of 2 mils, the expansion being a twofold increase in diameter and an equivalent increase in machine direction length. However, by using two moving belts on opposite sides of the tube, each of which was in contact with approximately 170° of the circumference of the tube, expansion of the tube in contact with the belts was restricted. The thickness of the tubular film in the restricted zone averaged 2.2 mils. The resulting transversely expanded tubular film was then slit in the center of each of the two thin lanes. The two resulting flat sheets were then advanced simultaneously through a regenerating bath containing 18% sodium sulfate, 3% sulfuric acid, the remainder being water. The regenerated cellulose film sheets were then purified, softened and dried in the conventional manner. The resulting one-mil thick sheets each displayed substantially uniform thickness across the width, the average variation being ±0.0001 inch.

*Example 2*

Viscose prepared from a pulp having a degree of polymerization of 800 but otherwise substantially as in Example 1, containing 12% cellulose and 10% sodium hydroxide and having a viscosity of 3500 poises, was extruded upwardly through an annular extrusion die having a lip opening of 35 mils. The resulting tubular film was extruded into an aqueous coagulating bath containing 50% ammonium sulfate and maintained at a temperature of 90° C.

Transverse expansion was accomplished as in Example 1 and the expansion was restrained by the use of two moving belts, each of which contacted 170° of the circumference of the tubular film. After transverse expansion the tubing was slit at approximately the center of the relatively thin lanes to form two flat sheets. The two sheets were thereafter processed simultaneously through the steps of regeneration, purification, softening and drying.

In order to maintain substantially identical orientation in both the transverse and longitudinal directions, the following system was used. The sheets were monitored with an instrument that measured birefringence. Birefringence is a measure of the orientation of cellulose chains in the film and is measured by determining optical retardation of polarized light passed through the film. The signal from this instrument was picked up by a photoelectric circuit which fed the signal back either to the pump supplying the viscose to the circular die or to the device which controlled the air pressure used to expand the tube. If the birefringence measurement showed that the film was oriented more in the longitudinal direction than in the transverse direction, then the device controlling air pressure opened to provide greater pressure and, thus, to increase transverse expansion. Simultaneously, this same information was fed to the viscose pump whose speed automatically increased to maintain constant unit weight. If the birefringence measurement indicated that the film was oriented more in the transverse direction than in the machine direction, then the signal fed to the pressure controller would reduce the pressure and the accompanying expansion, and the signal fed to the viscose pump would serve to decrease the pump speed.

The resulting film having a thickness of 1 mil and showing essentially the same birefringence in the longitudinal transverse directions displayed the following properties:

| Property | Value |
| --- | --- |
| Pneumatic impact strength (kg.-cm./mil) | 4.5. |
| Stress flex (strokes) | 50. |
| Tear strength (grams/mil) | 11. |
| Percent elongation | 30% in both directions. |
| Tensile strength (p.s.i.) | $20 \times 10^3$ in both directions. |
| Modulus (p.s.i.) | $100 \times 10^4$ in both directions. |

*Pneumatic impact strength* is the energy required to rupture a film. It is reported in kilograms-centimeters/mil of thickness of the film sample. Pneumatic impact strength is determined by measuring the velocity of a ball mechanically accelerated by air pressure, first in free flight and then in flight immediately after being impeded by rupturing the test film sample. In this test, the film sample is 1¾" x 1¾". The projectiles are steel balls ½" in diameter and weighing 8.3 grams. The free flight ball velocity is 40 plus or minus 2 meters/second. The velocities are measured by timing photoelectrically the passage of the steel balls between two light beams set a definite distance apart. The pneumatic impact strength is measured by the loss in kinetic energy of the ball due to the rupturing of the film sample. It is calculated from the following formula:

*Constant X/square of velocity in free flight—square of velocity in impeded flight* where the constant is directly proportional to the weight of the propectile and inversely proportional to the acceleration due to gravity. This test is carried out at 23° C. at 50% relative humidity and the test samples are conditioned for 24 hours at 23° C. and 50% relative humidity.

*Stress flex* is a measure of the flexibility and durability of the film. A sample of film 4" x 7" is placed between two rubber-faced clamps 1" apart. One clamp is stationary, the other slides back and forth by gravity on two rods flexing the film as the whole assembly rotates, until the film sample breaks. The stress flex value indicates the number of strokes of the movable clamp until the film sample breaks.

*Tear strength* is determined as described by D. W. Flierl, Modern Packaging, 52, 129 (1951).

*Elongation* is determined by elongating the film sample on a Scott Serigraph tester. A 3" x 7" sample is placed in 1" wide jaws stationed 3" apart. The sample is then elongated at the rate of 12" per minute. The force applied at the break in lbs./sq. in. (p.s.i.) is the *tensile strength*. The *modulus*, which is a measure of the stiffness of the film, is determined from the slope at an elongation of 1% of the curve obtained by plotting force vs. elongation. The elongation is the percent increase in the length of the sample at breakage.

*Example 3*

In this example the viscose was extruded through a circular die which was rotated to minimize variations in film thickness into a coagulating bath in the same manner as described in Example 1. Two moving belts, concave toward the tubing, were placed in contact with the tubing after it had advanced through the coagulating liquid and through the first set of nip rolls. The belts were adjusted so that each was in contact with approximately 170° of the circumference of the tube, the belts being arranged on opposite sides of the tubing. The tubing with an initial wall thickness of 11 mils was expanded laterally to a twofold increase in diameter. The main portion of the tubing at this stage had a wall thickness of approximately 2.5 mils; the lanes of the tubing which were not restrained from expansion by the belts had a wall thickness of approximately 2.3 mils. The tubular film was slit along the centers of the thinned lanes and then processed through baths to effect regeneration, purification and softening and were thereafter dried by passing through the dryer of a conventional casting machine with results the same as described in Example 1, i.e., a sheet having substantially uniform thickness across its width.

*Example 4*

In this example the viscose was extruded through a circular die which was rotated to minimize variations in film thickness into a coagulating bath of 50% ammonium sulfate at 85° C. The coagulated tube was expanded circumferentially by air pressure as it advanced through the coagulating liquid, with the expansion restraining belts arranged in the coagulating bath as shown schematically in FIGURE 2. The laterally expanded tubing was slit in the centers of the thinned lanes as the film advanced beyond the set of nip rolls and the flat sheets so produced were thereafter advanced through the steps of regeneration, purification, softening and drying in the conventional manner. Variations in thickness across the one-mil thick dried sheet from one edge to the other were less than ±0.0001".

Having fully disclosed the invention, what is claimed is:

1. A process which comprises the steps of extruding viscose in the form of a tubular film into a coagulating bath; advancing said tubular film through said bath to provide a gel tubular film having a substantially uniform wall thickness; and, thereafter, expanding the tubular film in a manner to provide at least one longitudinal lane in said film in which the wall thickness is less than the wall thickness of the remainder of the film.

2. A process which comprises the steps of extruding viscose in the form of a tubular film into a coagulating bath; advancing said tubular film through said bath to provide a gel tubular film having a substantially uniform wall thickness; thereafter, expanding the tubular film in a manner to provide at least one longitudinal lane in said film in which the wall thickness is less than the wall thickness of the remainder of the film; slitting the tubular film along the center of said longitudinal lane of relatively thin wall thickness to provide at least one flat sheet of film having relatively thin edge lanes; regenerating said film and, subsequent to regeneration, purifying, softening and drying said film.

3. A process as in claim 2 wherein the film is expanded to 1.5–3 times its extruded diameter.

4. A process as in claim 2 wherein the tubular film is expanded in the coagulating bath.

5. A process as in claim 2 wherein said tubular film is expanded to provide two longitudinal lanes in which the wall thickness is less than the wall thickness of the remainder of the film.

6. A process as in claim 2 wherein each of said longitudinal lanes comprises approximately 10% of the circumference of said tubular film.

7. A process as in claim 2 wherein said film is stretched in the direction of advancement simultaneously with the expansion step.

8. A process which comprises the steps of extruding viscose in the form of a tubular film into a coagulating bath; advancing said tubular film through said bath to provide a gel tubular film having a substantially uniform wall thickness; applying pressure within said tubular film to expand said tubular film and simultaneously imposing a pressure on a portion of the outside surface of said tubular film to provide at least one longitudinal lane in said tubular film in which the wall thickness is less than the wall thickness of the remaining circumference of said film.

9. A process which comprises the steps of extruding viscose in the form of a tubular film into a coagulating bath; advancing said tubular film through said bath to provide a gel tubular film having a substantially uniform wall thickness; applying pressure within said tubular film to expand said tubular film and simultaneously imposing a pressure on a portion of the outside surface of said tubular film to provide at least one longitudinal lane in said tubular film in which the wall thickness is less than the wall thickness of the remaining circumference of said film; slitting said tubular film along the center of said longitudinal lane of relatively thin wall thickness to provide at least one flat sheet of film having relatively thin edge lanes; regenerating said film and, subsequent to regeneration, purifying, softening and drying said film.

10. A process as in claim 9 wherein the pressure on a portion of the outside surface of the tubular film is imposed by mechanical means.

11. A process as in claim 9 wherein a portion of the outside surface of said tubular film is heated during expansion to provide a longitudinal lane of relatively thin wall thickness along the heated area.

12. A process as in claim 9 wherein the tubular film is expanded within a confining, moving endless belt that partially surrounds and contacts the tubular film and moves in the direction of advancement of the tubular film when contacting the film, the pressure within the film and the location of the belt arranged to provide said longitudinal lane at the unconfined portion of the film in which the wall thickness is less than the wall thickness of the remaining circumference of the film.

13. A process as in claim 12 wherein two moving endless belts partially surround the expanding, advancing tubular film to provide two longitudinal lanes in which the wall thickness is less than the wall thickness of the remaining circumference of the film.

14. A process as in claim 9 wherein the film is expanded to 1.5–3 times its extruded diameter.

15. A process as in claim 9 in which the rate of advancement of the tubular film through the coagulating liquid is 1.5–3 times greater than the rate of extrusion of said viscose.

16. An apparatus comprising a circular extrusion die adapted to extrude viscose in the form of a tubular film; a tank adapted to contain a liquid coagulant for said tubular viscose film; means for drawing said tubular film through said coagulant; means for expanding said tubular film circumferentially adapted to provide at least one continuous longitudinal lane in the film wherein the thickness is less than the thickness of the remainder of the film; means for slitting adapted to slit said tubular film along the center of the relatively thin longitudinal lane; means for regenerating viscose; and means for drawing said slit film through said regenerating means.

17. An apparatus as in claim 16 wherein said means for expanding is composed of pressuring means within said tubular film in combination with a moving endless belt disposed partially about said tubular film adapted to move in the same direction as said advancing tubular film and to restrain expansion of said film, the combination adapted to provide said longitudinal lane of lesser wall thickness in the tubular film.

18. Apparatus as in claim 16 wherein said means for expanding is composed of pressuring means within said tubular film in combination with two moving endless belts, each belt disposed partially about said tubular film adapted to move in the same direction as said advancing tubular film and to restrain expansion of said film, the combination adapted to provide two longitudinal lanes of lesser wall thickness in the tubular film.

19. Apparatus as in claim 16 wherein said means for expanding is disposed in said liquid coagulant-containing tank.

References Cited in the file of this patent
UNITED STATES PATENTS

| | | |
|---|---|---|
| 1,248,962 | Webber | Dec. 4, 1917 |
| 2,220,221 | Dalton | Nov. 5, 1940 |
| 2,337,927 | Reichel et al. | Dec. 28, 1943 |